Figure 1:
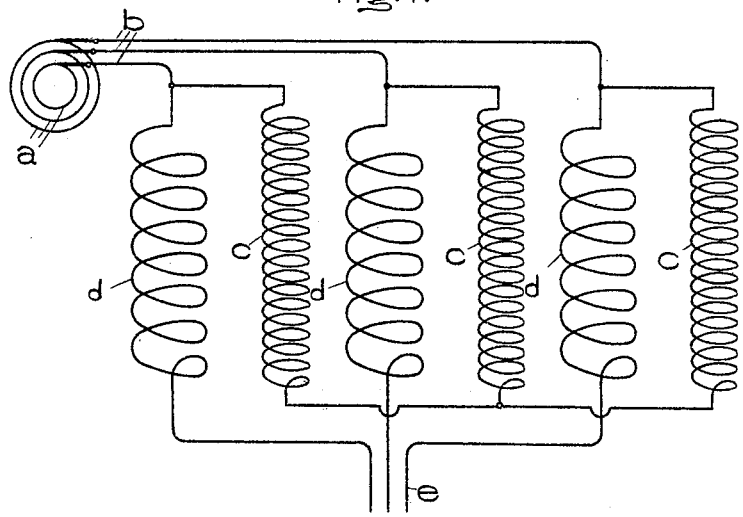

No. 771,299. PATENTED OCT. 4, 1904.
R. C. CLINKER.
APPARATUS FOR REGULATING ELECTRIC CURRENTS.
APPLICATION FILED JAN. 24, 1903.

NO MODEL. 3 SHEETS—SHEET 1.

Witnesses:
George A. Thornton.
Helen Oxford

Inventor:
Reginald C. Clinker,
by Albert G. Davis,
Att'y.

No. 771,299. PATENTED OCT. 4, 1904.
R. C. CLINKER.
APPARATUS FOR REGULATING ELECTRIC CURRENTS.
APPLICATION FILED JAN. 24, 1903.
NO MODEL. 3 SHEETS—SHEET 2.

Witnesses.
George A. Thornton.
Helen Orford.

Inventor.
Reginald C. Clinker.
by Albert G. Davis
Att'y.

No. 771,299. PATENTED OCT. 4, 1904.
R. C. CLINKER.
APPARATUS FOR REGULATING ELECTRIC CURRENTS.
APPLICATION FILED JAN. 24, 1903.
NO MODEL. 3 SHEETS—SHEET 3.

Witnesses:
George A. Thornton.
Helen Orford

Inventor:
Reginald C. Clinker,
by Albert G. Davis
Att'y.

No. 771,299.

Patented October 4, 1904.

UNITED STATES PATENT OFFICE.

REGINALD CHARLES CLINKER, OF RUGBY, ENGLAND, ASSIGNOR TO GENERAL ELECTRIC COMPANY, A CORPORATION OF NEW YORK.

APPARATUS FOR REGULATING ELECTRIC CURRENTS.

SPECIFICATION forming part of Letters Patent No. 771,299, dated October 4, 1904.

Application filed January 24, 1903. Serial No. 140,330. (No model.)

*To all whom it may concern:*

Be it known that I, REGINALD CHARLES CLINKER, a subject of the King of Great Britain and Ireland, residing at 235 Clifton road, Rugby, in the county of Warwick, England, have invented certain new and useful Improvements in Apparatus for Regulating Electric Currents, of which the following is a specification.

My invention relates to polyphase alternating-current-regulating apparatus of the kind having a primary and secondary winding connected, respectively, in shunt and series with the supply-circuit. Such appliances as usually constructed resemble an induction-motor, the stator-winding of which forms the primary and the rotor-winding the secondary, or vice versa, and hand or motor operated mechanism actuating the rotor is provided, whereby the relative positions of the windings may be varied, so as to change the phase relationship of the voltage impressed on the main circuit by the primary, thereby regulating the main voltage. This construction, however, has the disadvantage that it necessitates skilled attendance, thereby rendering it costly to operate; and the object of my invention is to overcome this objection by providing an apparatus which shall effect the regulation automatically in accordance with the load on the circuit or system on which it is connected.

To this end my invention consists in an induction-regulator in which the operating mechanism is dispensed with and the rotor is free to move relatively to the stator, so that it assumes a position of equilibrium dependent on the load on the system and such as to effect the required regulation.

My invention further consists in means for automatically controlling the movement of the rotor of the regulator.

In a regulator constructed in this manner it will be seen that as soon as the circuit on which it is connected becomes loaded a torque will be developed, causing the rotor to move toward a position in which the torque becomes zero. This position for any given load is a perfectly stable one, any attempt to displace the rotor in either direction being resisted by a counter-torque, which depends upon the angle of displacement. Any change in magnitude of current in the circuit or change of phase due to inductance, resistance, or capacity in the load will at once cause the rotor to again turn so as to preserve the zero value of the torque, thus regulating the main voltage automatically in accordance with working requirements. It will thus be seen that the regulator will be similar in its action to a reactive coil inasmuch as it will introduce a voltage into the circuit which is nearly at right angles to the current, but with the important difference that the voltage introduced is practically independent of the secondary current and depends only on the primary voltage.

In the accompanying drawings I have illustrated the application of my improved regulator to the regulation of a three-phase system; but it will be obvious that it is applicable to polyphase systems generally.

Figure 2:
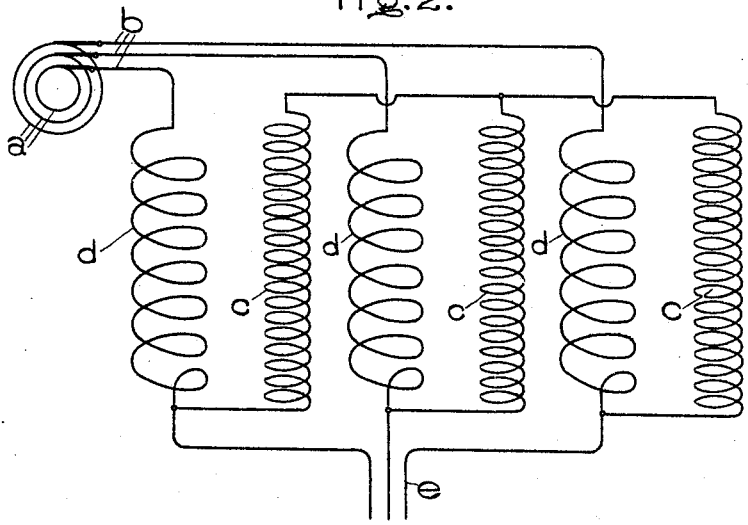
Figure 3:
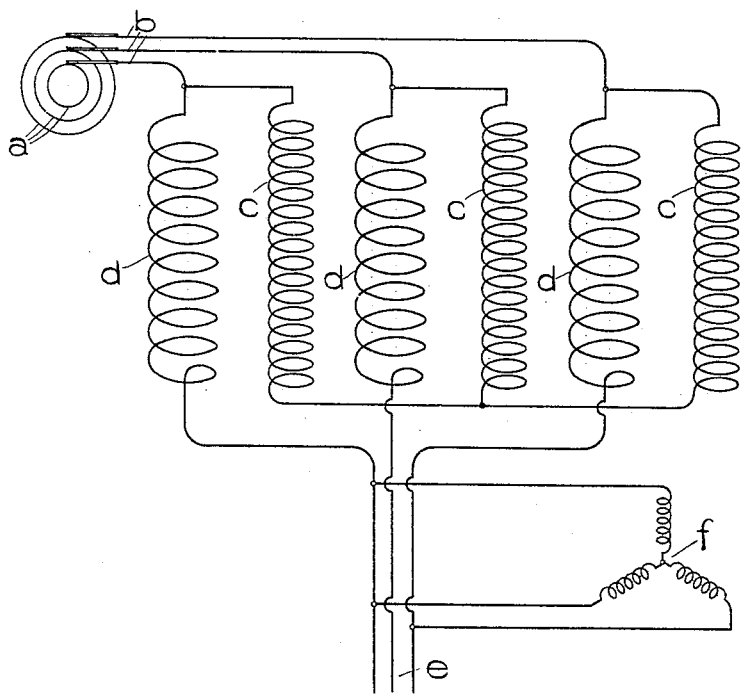
Figure 4:
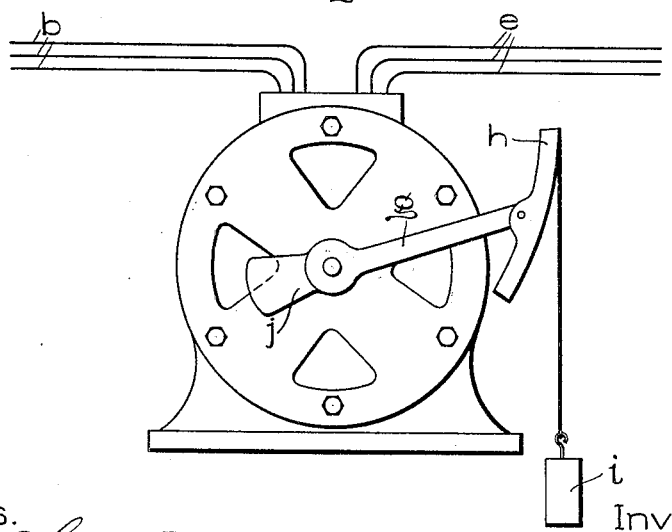
Figure 5:
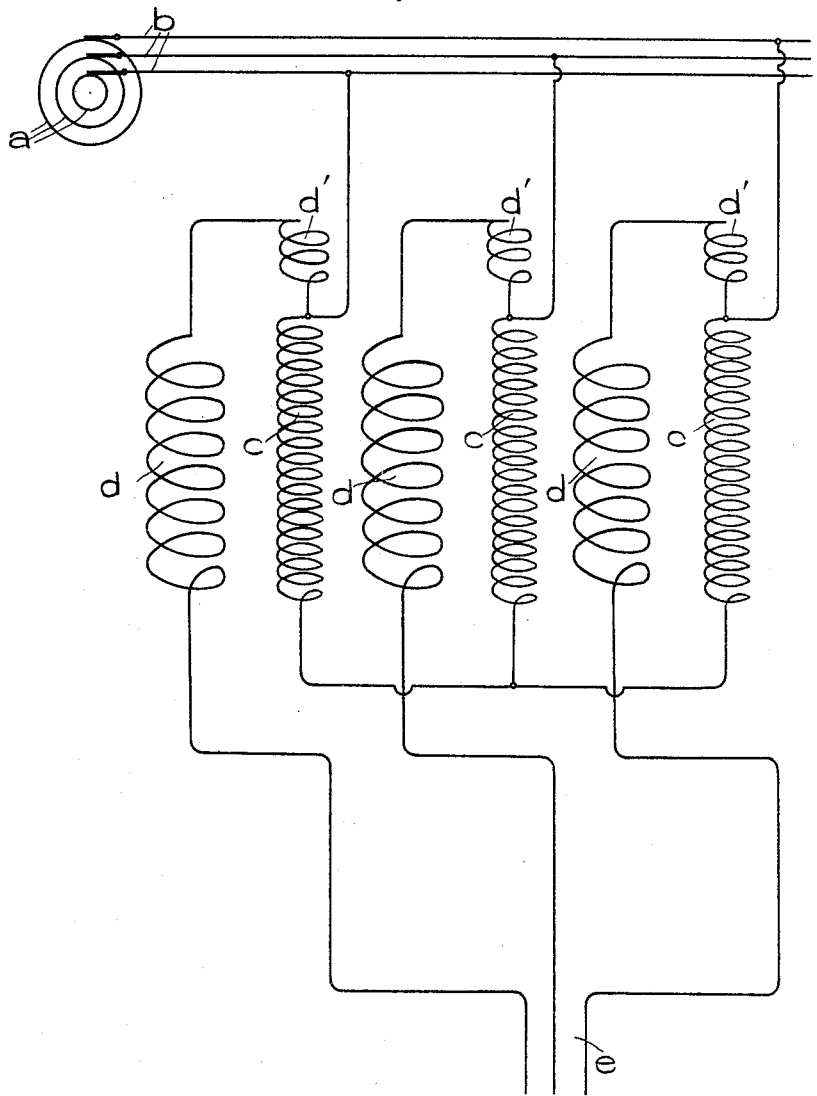

Figures 1 and 2 are diagrammatic illustrations of different methods of connecting the regulator. Fig. 3 shows a method of controlling the movement of the rotor by means of a shunt reactance connected upon the load side of the regulator. Fig. 4 is a view of a regulator fitted with a mechanical appliance for automatically controlling the movement of the rotor, and Fig. 5 is a diagrammatic view of an arrangement of circuits of the regulator which is suitable for use where a number of feeders in parallel with the main supply-circuit are compounded to different extents by a regulator in each feeder.

In the figures I have not specifically shown the mechanical structure of my improved regulator, as it only differs from the ordinary regulator in the omission of the operating mechanism.

The shaft of the rotor should be mounted so that it is free to revolve with as little friction as possible, and it may be arranged either horizontally or vertically.

Referring to the figures, $a$ represents the collector-rings of a generator supplying a main three-phase circuit $b$, to which the regulator is connected, with its primary winding

*c* in shunt to the circuit and its secondary winding *d* in series therewith. The secondary windings are connected in such a direction that the field produced by them rotates in the same direction as the primary field. The primary may be situated on the stator of the regulator and the secondary on the rotor, or vice versa.

*e* represents the load-circuit leading from the regulator.

In Fig. 1 I have shown the primary connected on the generator side of the secondary, so that the primary current does not flow through the secondary. This is the ordinary method of connection; but I prefer to employ the connection shown in Fig. 2, where the primary leads are taken from the load side of the secondary. This connection has the advantage that as the primary current is at high loads always a leading one its presence in the secondary winding assists in the voltage regulation. When the circuit *e*, Fig. 2, is unloaded, the only current taken is that required for magnetizing the primary *c*, and whatever be the phase of the secondary current the rotor or secondary will so place itself that the revolving field will rotate in the same phase and at the same rate as that of the primary. Hence the secondary and primary currents will magnetize in the same direction, and starting from no load an increase of the secondary current will cause a decrease of primary current by imposing an increasing counter electromotive force on the primary winding, which reduces the primary current to a minimum value, after which a leading current will flow in the primary, the movement of the rotor taking place in accordance with the load increase, so that for any given load it occupies a position at which a balance is obtained between the torque produced by the load-current and that due to the controlling force which is employed to resist the movement of the rotor.

The voltage induced in the secondary is sensibly constant for all positions of the rotor, and its phase only changes. When a lagging current is taken by the load, the secondary turns so that its voltage is opposed to that of the line, while upon any advance in phase of the load-current the secondary will turn so as to allow the voltage on the load side of the regulator to rise.

In order to control the movement of the rotor, I may employ, as shown in Fig. 3, a reactance *f*, which is connected to the feeders *e* on the load side of the regulator. With no load on the circuit this reactance allows a lagging current to flow in the secondary coil, which sets the phase of the secondary voltage so that it opposes the generator voltage. When load is placed on the feeders *e*, the secondary *d* turns and raises the voltage. The position which the secondary takes up for a given load depends upon the ratio of the load-current to that flowing in the reactance-coils. The latter therefore acts like a controlling force on the secondary. As it is difficult by this method of control to secure compounding strictly in accordance with the load, I prefer to employ mechanical means for controlling the movement of the rotor. This may consist of a spring or weight which is utilized to provide a resisting force increasing with the annular displacement of the rotor. An example of such application is illustrated in Fig. 4, where a lever-arm *g* is secured to the shaft of the rotor, on the extremity of which is provided a sector *h*. Weight *i* is suspended from this sector, which is constructed with a variable radius, so as to vary the opposing torque of the weight and compensate for the varying torque produced by the load-current in different positions of the rotor. The radius of the sector *h* is a maximum in the no-load position of the rotor and diminishes gradually as the rotor turns toward the limit of the range of its movement. A counterweight *j* may be fitted to balance the weight of the lever-arm and sector. It will be obvious that in place of a weight a spring may be used to provide a force opposing the torque exerted on the rotor, so as to cause the voltage to rise as nearly as possible proportionally to the load. This spring may operate on the rotor through a cam or equivalent device, which may be fitted on or geared to the shaft of the latter.

In the use of induction-regulating apparatus as above described the voltage at no load on the load side of the regulator is less than that upon the generator side, and in some cases—for example, where several feeders are working in parallel off common bus-bars and are compounded to different extents by a regulator in each—it is inconvenient to have different voltages on the feeders at no load. To obviate this, I connect the regulator, as shown in Fig. 5, so that the load-current flows through a small portion *d'* of the series winding arranged on the stator or primary member of the regulator, the remainder of the primary winding *c* being connected in shunt to the line, as before. By suitably proportioning the number of turns in the two parts of the primary the voltage at no load on the load side of the regulator may be made either equal to or any desired fraction of that on the generator side. At no load the rotor is in such a position that the windings *d* oppose their voltage to that of the line. If, therefore, the number of turns in the parts *d'* be so chosen that the electromotive force induced in each of these parts is equal to that induced in each of the secondary windings *d*, the voltage on the generator and load sides will be equal at no load. It is to be understood that in regulators wound in this manner either of the methods of connection above described with reference to Figs. 1 to 3 may be employed.

The apparatus, among other applications, may be employed for compounding rotary converters instead of the reactances at present used for this purpose. Reactances introduced into the polyphase side of a rotary converter have the great disadvantage of requiring large wattless currents at no load in addition to limiting the compounding obtainable, owing to the effect of the wattless current on the good running of the rotary. By replacing the reactance with a regulator, as above described, greater compounding may be obtained with much smaller or no wattless currents at no load, owing to the fact that the secondary voltage of the regulator is independent of the current.

Having now described my invention, what I claim as new, and desire to secure by Letters Patent, is—

1. A regulator for a polyphase electric system comprising an inducing and an induced polyphase member, one of said members being fixed and the other movable; separate windings on said members connected respectively in series between the supply-lines and the work and in shunt between the said lines, and means for automatically controlling the relative position of the inducing and induced windings in accordance with the load on the system substantially as described.

2. A regulator for a polyphase electric system comprising an inducing and an induced polyphase member, one of said members being fixed and the other freely movable; independent windings on the two members connected respectively, in series between the supply-lines and the work, and in shunt between the said lines, and reactance connected in parallel with the work-circuit, whereby the relative position of the inducing and induced windings varies with change in the nature and magnitude of the load so as to vary the voltage on the load-circuit.

3. A regulator for a polyphase electric system comprising an inducing and an induced polyphase member, one of said members being fixed and the other movable, independent windings on the two members connected respectively in series between the supply-lines and the work-circuit, and in shunt between said lines; mechanical means for automatically resisting the movement of the movable member, whereby the voltage on the work-circuit is regulated in accordance with the load on said circuit, as set forth.

4. The combination of a polyphase alternating-current generator lines leading therefrom and a regulator comprising an inducing and an induced polyphase member, one of said members being fixed and the other freely movable, independent windings on the two members, one of said windings being connected in series between the supply-lines and the work-circuit, and the other winding in parallel with the said lines on the load side of the regulator, and means for automatically controlling the relative position of the inducing and induced windings, whereby the voltage impressed on the work-circuit changes with variation of load as set forth.

5. In combination an alternating-current generator, lines leading therefrom between which a difference of potential is maintained, feeders connected in parallel with said lines, an automatically-operating induction-regulating apparatus connected in each set of feeders and comprising a fixed member and a rotatably-mounted member, the first having a winding partly in shunt and partly in series with the feeders, and the second member independent windings in series with the feeders, as and for the purpose set forth.

6. A device for producing a reactive voltage practically constant in value irrespective of the current in the circuit including said voltage, consisting of two members in mutual inductive relation, windings on said members forming the seats of rotary magnetic fields turning in the same direction, and means for allowing adjusting movement between said members.

In witness whereof I have hereunto set my hand in presence of two witnesses.

REGINALD CHARLES CLINKER.

Witnesses:
HENRY GUY SILK,
HENRY CHARLES CHAMBERS.